3,592,672
DRY STABILIZED, REWETTABLE SEMIPERMEABLE CELLULOSE ESTER AND ETHER MEMBRANES AND THEIR PREPARATION
Martin E. Rowley, Hilton, and Walter D. Slowig, Rochester, N.Y., assignors to Eastman Kodak Company, Rochester, N.Y.
No Drawing. Continuation-in-part of application Ser. No. 726,550, May 3, 1968. This application Dec. 22, 1969, Ser. No. 887,313
Int. Cl. B29d 27/04; C08b 27/42; C08h 17/34
U.S. Cl. 106—189                                 27 Claims

ABSTRACT OF THE DISCLOSURE

Membranes specially adapted to preferentially permit the passage of relatively pure water through them, while resisting the passage of dissolved salts must conventionally be kept water-wet in order to retain this ability to exclude salts. Dry, rewettable, stabilized membranes in which this desirable property is preserved, can be made by treating the wet membrane first with a water-miscible solvent, then with a non-polar organic solvent and finally drying the membrane. The presence of a water-soluble polyol in the dry membrane results in still better properties.

---

This application is a continuation-in-part of U.S. patent application Ser. No. 726,550, filed May 3, 1968 and now abandoned.

The present invention relates to methods for converting water-wet cellulosic membranes into dry, stabilized membranes that can be rewet to function efficiently in selective diffusion processes. This invention also relates to the resulting dry, stabilized rewettable membranes.

Over the past several years, a large amount of interest has developed in various methods for purifying aqueous solutions containing, dissolved therein, various salts, including sodium chloride. Many cellulosic membranes have been developed to aid in such purifying processes. Examples of some of these membranes and of the special processes required for their preparation can be found in U.S. Pats. 3,133,132; 3,283,042; 3,344,214; U.S. patent application, Ser. No. 709,195, filed Feb. 29, 1968 and now Pat. No. 3,527,853 and Ser. No. 709,226 filed Feb. 29, 1968 and now Pat. No. 3,222,335. Generally, useful cellulosic membranes are termed "semipermeable membranes" which are made by first forming a dope containing a cellulose ester, a cellulose mixed ether-ester or cellulose ether having the formula,

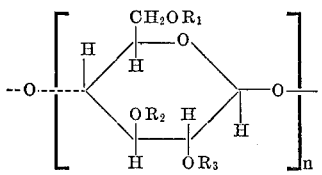

wherein $R_1$, $R_2$ and $R_3$ are members of the group consisting of hydrogen, alkyl groups containing 1 to 5 carbon atoms and acyl groups containing 2 to 5 carbon atoms, and at most about one-third of $R_1$, $R_2$ and $R_3$ is hydrogen. Particularly preferred cellulosic membranes are those in which the cellulosic material consists essentially of cellulose acetate containing from about 35 to about 44.5% acetyl (i.e., "partially hydrolyzed" cellulose acetate). Generally, the cellulosic membranes useful in the practice of this invention have a thickness of from about ½ to about 40 mils. Particularly preferred membranes are made by processes which result in the formation at one surface thereof of a so-called "active" layer, which is in turn underlaid with a fairly porous "support" layer. This bilayer arrangement is not present in all of the useful membranes however.

Such porous cellulosic membranes are almost invariably manufactured by processes that result in the final membrane being substantially saturated with water. Ideally, since most of the membranes to which this invention relate are to be shipped from the place at which they are manufactured to some other place where they will be used, it is desirable to remove at least most of the water container in the membranes prior to shipment. However, when the conventional water-wet membranes are dried in accordance with any of the conventional film drying techniques such as air drying, over drying, and the like, the resulting dried membranes (for some as yet unexplained reason) lose practically all of their "selective diffusion" ability and also lose both their flexibility and their dimensional stability, and generally become wrinkled and lose their preferred shape.

It has now been discovered that dry, flexible, rewettable cellulose membranes can be prepared from such water-wet membranes by a special technique involving effectively at least two stages and types of organic solvent treatment. Thus, it has been discovered that if the water-wet membrane is (a) initially contacted with a fairly anhydrous water-miscible organic solvent (which is a nonsolvent for the cellulosic membrane) for a sufficient period of time and in such a way that by far the greater proportion of the water that was initially absorbed in the water-wet membrane is replaced by the water-miscible organic solvent, and (b) then the resulting largely anhydrous membrane (now containing absorbed therein a large amount of water-miscible organic solvent) is subsequently contacted with an organic nonpolar solvent (which is a nonsolvent for the cellulosic membrane) for a sufficient length of time and in such a manner that practically all of the water-miscible organic solvent in the membrane is replaced with the nonpolar solvent, and (c) the resulting membrane is subsequently dried in a conventional manner, a dry flexible, rewettable cellulosic membrane is produced in which the desired "selective diffusion" properties of the original water-wet membrane are retained.

The term "water-miscible organic solvent" is intended herein to mean any organic liquid that is fluid at temperatures of from about 5° C. to about 40° C. which has the ability to "dissolve" (forming a clear solution with) at least about 5 weight percent of water. Typical, non-limiting examples of such water-miscible organic solvents are methanol, ethanol, n-propanol, isopropanol, n-butanol, and isobutanol. Of these the use of ethanol or isopropanol is preferred. The "nonpolar organic solvents" that are useful in the practice of the present processes are those that are liquid under atmospheric pressure at temperatures of from about 5° C. to about 40° C. and which are in turn miscible with the "water-miscible organic solvent" that is present in the membrane at the time the mebrane is brought into contact with the nonpolar organic solvent. The water-miscible organic solvent is considered "miscible" with the nonpolar solvent if at least about 5 weight percent of the water-miscible solvent can be "dissolved" into (forming a clear solution with) the nonpolar solvent. Typical, nonlimiting examples of such useful nonpolar organic solvents are benzene, toluene, petroleum ether, xylene, naphthal, ethyl ether, hexane and cyclohexane. Of these the hydrocarbons are preferred. Particularly preferred are hexane and cyclohexane.

The "contacting" that must be accomplished in several of the steps of the present process means simply bringing the membrane into physical contact with the particular solvent system in such a way that the solvent system has an opportunity to replace the particular liquids that are contained (absorbed) in the membrane when the membrane is brought into contact with the solvent system. Such contacting can be accomplished in any of a number of ways. For example, in continuous processes for manufacturing the membranes, water-wet membranes can simply first be led through a reservoir containing the water-miscible organic solvent and then be held in this reservoir for a sufficient amount of time to permit the water-miscible organic solvent to diffuse into and through the membrane and thereby extract preferably at least about 90 weight percent of the water that was originally present in the water-wet membrane. Then the resulting membrane, which is practically saturated with the water-miscible organic solvent, (which membrane will herein be called a "first stage membrane") can be passed, if desired, through a slot or between rolls for the purpose of removing most of the excess water-miscible organic solvent from the surface of the membrane, and can then be passed into a second reservoir which contains the nonpolar organic solvent. In this second reservoir, a similar extraction process takes place. Thus, the nonpolar organic solvent enters into and through the membrane, simultaneously dissolving at least the greater proportion of water-miscible organic solvent that had initially been present in the membrane, thereby resulting in the formation of a membrane containing absorbed therein a fairly large quantity of the nonpolar organic solvent. Generally, at least about 70 weight percent (and preferably at least about 85 weight percent) of the liquid materials absorbed into the cellulosic membrane (at the time the membrane is removed from contact with the bath or stream of nonpolar organic solvent) should be the nonpolar organic solvent. For convenience, the membrane at this stage in the present processes will herein be termed a "second stage" membrane. If desired, any excess nonpolar organic solvent can be removed from the surface of the second stage membrane prior to its introduction into the drying step of the present process. This drying step involves subjecting the "second stage" membrane to an atmosphere (preferably a warm one) into which the nonpolar organic solvent in the second stage membrane can be evaporated. The amount of time required for this drying step can vary over a wide range because of the various drying conditions and various drying atmospheres that can be utilized. However, all that is necessary for the useful practice of this aspect of the present invention is that somehow at least about 90 weight percent of the nonpolar organic solvent in the "second stage" membrane be evaporated from the membrane to thereby yield the desired final product; a dry, flexible, rewettable cellulosic membrane having the ability (when rewet) to permit selective diffusion of a component of an aqueous solution therethrough. For example, one of the most important uses for such membrane is in so-called "reverse osmosis" processes wherein salty water is applied under pressure to one surface of the membrane, whereby only relatively pure water is passed through the membrane and recovered.

The contacting that is necessary for the useful practice of this invention can also be accomplished by simply passing a quantity of the appropriate solvent system (in the appropriate order) through the membrane by the action of gravity, or under pressure, if desired. Still another method for providing the necessary contacting involves the spraying onto the surface of a moving continuous film of the membrane (from a series of nozzles located over and along the path of the membrane) the various solvents or solvent systems that are selected to accomplish the necessary extraction as set out above. If desired, the membrane in a progressive series of exposures can first be contacted with isopropanol, for example, until the necessary amount of water has been removed from the membrane. Then a mixture of xylene and isopropanol can be utilized (with progressively more concentrated mixtures of xylene and isopropanol being utilized along the moving belt toward the point where pure hydrocarbon is used). Finally, relatively pure xylene can be used to remove from the membrane the last remaining portions of the isopropanol. From the foregoing, it can be appreciated that other manipulative procedures for accomplishing the necessary contacting can also be used successfully in the practice of this invention. Generally, the temperature at which these contacting steps are accomplished is not critical in the practice of this invention so long as temperature below the boiling points of the various solvent systems are utilized. However, it is preferred that contacting temperatures be maintained within the range of from about 15° C. to about 40° C. Similarly, the final evaporation step described above can be practiced at practically any reasonable temperature below the softening point of the membrane. Generally, however, the temperature of the membrane during the drying step should be maintained below about 80° C. Preferably, this temperature should be below about 50°C.

Although the solvents and solvent systems described above have been discussed as though they were intended to be pure mixtures of the desired materials, the present invention can be practiced successfully even though they contain fairly large amounts of other materials dissolved therein. For example, it has been discovered that the presence of up to about 20 weight percent of a water soluble polyol having a melting point below about 35° C. in the water-miscible organic solvent system (during the formation of the first stage membrane) is actually extremely desirable, since its presence in the "first stage" membrane ultimately results in the formation of a final dried membrane having still more desirable properties than the dried membrane would have otherwise. These more desirable properties include better flexibility, better resistance to tear, and better shape and size retention during prolonged storage of the membranes over a wide variety of humidity and temperature conditions. Apparently these better properties result from retention in the final "dried" membrane of an effective amount (preferably from about 5 to about 70 weight percent, based on the total weight of the final "dried" membrane) of the polyol that remains in the membranes through the final drying step.

The water-soluble polyols that are preferred for use in the practice of this aspect of the present invention include ethylene glycol, glycerine, propylene glycol, the polyethylene glycols such as diethylene glycol, triethylene glycol and the like, poly(ethylene oxide), and the like, which are also nonsolvents for the cellulosic membranes.

In the following examples, all "parts" are by weight unless otherwise specified.

EXAMPLE 1

(A) A solution of 100 parts of cellulose acetate (containing 39.8% acetyl) in a mixture of 180 parts of acetone and 120 parts of formamide is coated onto a belt of biaxially oriented poly(ethylene terephthalate) at a dope thickness of about 10 mils. The resulting layer is then dried at 30° C. (with dry air) for 10 seconds and then quickly quenched in about 1° C. water to thereby produce a water-wet membrane having a thickness of 4 mils.

(B) A portion of this water-wet membrane is then immersed in 100 parts of practically anhydrous isopropyl alcohol at 30° C. for 30 minutes. The alcohol is agitated slowly during this immersion step. At the end of this time, the membrane is removed from the alcohol bath, shaken to remove excess alcohol from its surfaces, and then immersed in 100 parts of agitated hexane at a temperature of about 30° C. for 30 minutes. Subsequently, the membrane is removed from this bath and air-dried under ambient conditions for 24 hours.

(C) After being stored dry for several days, the membrane is rewet briefly with water and then subjected to a standard "reverse osmosis" membrane test involving subjecting one side of the membrane to an aqueous solution containing 5,000 p.p.m. of NaCl under 600 p.s.i. of pressure, and measuring the amount and quality of the water passed through the membrane. Results of this test are set out in Table I.

TABLE I

| Membrane tested | Throughput (gal./sq. ft./day) | Percent salt exclusion |
| --- | --- | --- |
| Membrane of Ex. 1 (briefly wet) | 10 | 96 |
| Wet conventional membrane [1] | 20 | 97 |
| Dry conventional membrane [2] | 0 | |
| Membrane of Ex. 1 (no wetting first) | 6 | 95 |

[1] Made as in paragraph A of Example 1, but subsequently tempered for 4 minutes in 170° F. water.
[2] The "wet conventional membrane" that has been air-dried for 24 hours under ambient room conditions. This membrane is wrinkled and extremely difficult to test because of its poor pyhsical stabliity.

EXAMPLE 2

The alcohol wet membrane of Example 1 is treated with cyclohexane instead of hexane. Otherwise Example 1 is followed.

EXAMPLE 3

Example 1 is repeated, except that the membrane is immersed in the respective organic solvents for only 5 minutes each.

EXAMPLE 4

Example 1 is followed, except that 3A ethanol is used in place of the isopropanol.

TABLE II

| Membrane tested | Throughput (gal./sq. ft./day) | Percent salt exclusion |
| --- | --- | --- |
| Membrane of Example 2 | 8 | 96 |
| Membrane of Example 3 | 8 | 94 |
| Membrane of Example 4 | 14 | 95.6 |

EXAMPLE 5

(A) Cellulose acetate containing 40% acetyl and having an intrinsic viscosity of about 1.2 (100 parts) is dissolved into a blend of 160 parts of acetic acid and 140 parts of acetone. Into the resulting solution are blended 80.5 parts of an amine salt solution prepared by blending together 935 parts of acetic acid, 376 parts of triethylamine and 192 parts of acetic acid, 376 parts of triethylamine and 192 parts of 95% sulfuric acid. This dope is then coated as in Example 1, exposed to dry air at 30° C. for 50 seconds and then immediately quenched in a 1° C. water bath (for 5 minutes).

(B) The resulting 5 mil thick water-wet membrane is dewatered by immersion in 100 parts of initially dry isopropanol for 30 minutes (at about 30° C.) wiped clear of excess isopropanol on its surfaces, and then immersed in hexane for 30 minutes and subsequently dried at 40° C. in a forced draft explosion proof oven. When briefly rewet with water and then tested in the foregoing standard "reverse osmosis" test, the membrane yields a throughput of 19 gal./ft.$^2$/day with a salt exclusion of over 95%.

Similar excellent results can be obtained by using the other celluosic membranes, water-miscible solvents and nonpolar solvents described above.

It should be noted that the practice of the present invention makes possible not only the manufacture of dry, rewettable membranes that are stabilized against the loss of their ability to permit the desired selective diffusion therethrough, but it also results in the elimination, if desired, of the usual hot water "tempering" step (in processes for manufacturing "reverse osmosis" membranes). This benefit can readily be appreciated from the foregoing Examples 1–5. Thus, if the water-wet membranes of Example 1 is utilized directly in the standard "reverse osmosis" test (without either a hot water "tempering" step or the special treatment of the present invention), the throughput would be about 200 gal./ft.$^2$/day. However, practically no salt exclusion could be obtained.

Still another advantage that can result from practicing this invention is illustrated in Example 6, below. This advantage relates to the discovery that especially flexible, highest quality, dry, rewettable, stabilized membranes can result when an effective amount of one of (or a mixture of them) the aforementioned water soluble polyols is distributed through the membrane prior to the final drying step. Preferably the polyol is glycerine or a poly(ethylene glycol) or a lower molecular weight poly(ethylene oxide).

EXAMPLE 6

Example 1 is repeated except that the isopropanol bath is replaced with a blend containing 12.5 weight percent of glycerine and 87.5 weight percent of isopropanol. The final, dried membrane then contains about 28 weight percent of glycerine, uniformly dispersed through the membrane. Throughput or "flux" of this film is 70 gal./ft.$^2$/day, with 20% salt exclusion.

EXAMPLE 7

A one mil dried membrane is cast and cold water treated as in Example 1. It is subsequently immersed in 3 baths, (a) 3A alcohol
(b) 3A alcohol containing 17.5 weight percent of glycerine, and
(c) hexane, in that order for 30 minutes each at 30° C. After being air-dried at 30° C., the resulting membrane, containing 46 weight percent of glycerine, has a flux at 600 p.s.i. of 142 gal./ft.$^2$/day. It is especially useful in filtering fresh beer, and has very little ability to exclude dissolved NaCl.

EXAMPLE 8

Example 7 is repeated, except that the membrane is subjected to a "tempering" step at 185° F. for 4 minutes in hot water just prior to being contacted with the alcohol. Flux for the resulting final film is 25 gal./ft.$^2$/day, with 70% salt exclusion.

Optimum levels of water soluble polyol in the valuable "dry" (essentially nonaqueous), rewettable, stabilized cellulosic membranes of this invention lie within the range of from about 5 to about 20 weight percent, based on the total weight of the "dry" final membrane. It is preferred, but apparently not essential that such membranes contain at most only tbout 2.5 weight percent of water (absorbed therein), although generally no more than about 5 weight percent of water should be present in such "dry" membranes. Similarly, small amounts of nonpolar solvent(s) can also be present in such final "dry" membranes, although it is preferred, for optimum results, that essentially all of such nonpolar solvents be removed from such membranes during the evaporating step in order to obtain membranes having salt exclusion values of over 95%.

Similar excellent results can be obtained by using the other cellulosic membranes, water-miscible solvents and nonpolar solvents described above.

It should be noted that the practice of the present invention makes possible not only the manufacture of dry, rewettable membranes that are stabilized against excessive wrinkling and shrinkage and the like as well as against the loss of their ability to permit the desired selective diffusion therethrough, but it also results in the elimination, if desired of the usual hot water "tempering" step (in conventional processes for manufacturing "reverse osmosis" membranes). This benefit can readily be appreciated from the foregoing Examples 1–5. Thus, if the water-wet membrane of Example 1 is utilized directly in conventional "reverse osmosis" equipment (or in the standard "reverse osmosis" test described above), the salty water would pass through the membrane with practically no purification being accomplished. This problem is conventionally overcome by "tempering" the water-wet membrane in hot water (120–180° F.) for a period of time. By comparison, it can be seen from the foregoing examples, that the excellent salt exclusion and flux values result from using the dry, rewettable membranes of the present invention even though the hot water "tempering" step has not been used. However, if desired, a "tempering" step can be used in combination with the present processes for preparing the valuable dry, stabilized, rewettable membranes of this invention.

It should also be kept in mind that the present processes can be used to manufacture dry, rewettable membranes from any water-wet, semipermeable polymeric membrane that is extremely porous. Best results in the practice of the present processes can apparently be obtained with cellulose acetate membranes that are especially adapted for "reverse osmosis" processes. Such membranes have a very porous, relatively thicker "support" layer. They can readily be recognized by their ability to be effective in excluding the passage of salt therethrough in only one direction (where the "active" layer is on that surface which is in direct contact with the salty, impure water that is to be purified via the "reverse osmosis" processes). However, it should be noted that the benefits that can be obtained from practicing the present invention are not limited to making and using membranes especially adapted for use in "reverse osmosis" processes. Rather, such benefits can be obtained with any water-wet cellulosic ether, ester, or ether/ester type membrane having selective diffusion properties that need to be retained and that are normally either decreased substantially or lost entirely when the membrane is dried conventionally.

The invention has been described in detail with particular reference to preferred embodiments thereof, but it will be understood that variations and modifications can be effected within the spirit and scope of the invention as described hereinabove and as defined in the appended claims.

What is claimed is:

1. A dry, flexible, non-wrinkled, stabilized semipermeable cellulosic reverse osmosis membrane containing absorbed therein a water soluble polyol and having the ability after being rewetted with water to perform as an effective reverse osmosis membrane; the cellulosic material of said cellulosic membrane being selected from the group consisting of cellulose esters and ethers and cellulose mixed ether-esters having the formula:

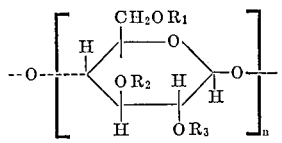

wherein $R_1$, $R_2$ and $R_3$ are members of the group consisting of hydrogen, alkyl groups containing 1 to 5 carbon atoms and acyl groups containing 2 to 5 carbon atoms, and at most about one-third of $R_1$, $R_2$ and $R_3$ is hydrogen.

2. A dry, flexible, non-wrinkled, stabilized semipermeable cellulosic reverse osmosis membrane as in claim 1 wherein said cellulosic material is cellulose acetate.

3. A dry, flexible, non-wrinkled, stabilized semipermeable cellulose acetate reverse osmosis membrane as in claim 2, wherein said cellulose acetate contains from about 35 to about 44.5 percent acetyl.

4. A dry, flexible, non-wrinkled, stabilized semipermeable cellulose acetate reverse osmosis membrane as in claim 3, wherein said cellulose acetate contains about 40 percent acetyl.

5. A dry, flexible membrane as in claim 2, wherein said membrane contains from about 5 to about 70 weight percent, based on the total weight of said dry flexible membrane, of a water soluble polyol having a melting point below about 35° C.

6. A dry, flexible cellulose acetate membrane as in claim 3, wherein said membrane contains from about 5 to about 20 weight percent of a water-soluble polyol having a melting point below about 35° C.

7. A dry, flexible cellulose acetate membrane as in claim 6, wherein said water-soluble polyol is glycerine.

8. A dry, flexible cellulose acetate membrane as in claim 6, wherein said polyol is ethylene glycol.

9. A dry, flexible cellulose acetate membrane as in claim 6, wherein said polyol is a poly(ethylene glycol).

10. A dry, flexible cellulose acetate membrane as in claim 6, wherein said polyol is propylene glycol.

11. A dry, flexible, stabilized cellulosic semipermeable membrane which, when rewet with water, is adapted to permit selective diffusion therethrough; said membrane containing absorbed therein, from about 5 to about 70 weight percent of a water soluble polyol, and said polyol containing at least 2 carbon atoms and having a melting point below about 35° C.

12. A dry, flexible, stabilized semipermeable cellulosic membrane as in claim 11, wherein the cellulosic portion of said membrane consists essentially of cellulose acetate; said membrane, when rewet with water, having the ability to selectively preclude the passage of dissolved salts therethrough when it is used as a membrane in reverse osmosis processes.

13. A process for manufacturing a dry, stabilized, rewettable cellulosic ester or ether semipermeable membrane from a water-wet cellulosic membrane adapted to permit selective diffusion therethrough in a reverse osmosis procedure, which process comprises the steps of (a) contacting said water-wet membrane with an amount of a liquid water-miscible organic solvent containing at least one hydroxyl solvent (which is fluid at temperatures of from about 5° C. to about 40° C. and a non-solvent for said cellulosic membrane) sufficient to extract at least about 95 weight percent of the water from said water-wet membrane for a period of time sufficient to produce a first stage membrane containing absorbed therein a liquid which consists essentially of a mixture of water and said water-miscible organic solvent; at least about 80 weight percent of said liquid being said water-miscible organic solvent;

(b) contacting said first stage membrane with an amount of a nonpolar hydrocarbon solvent (which is a nonsolvent for said cellulosic membrane, which is liquid under atmospheric pressure at a temperature within the range of from about 5° C. to about 40° C., and which is miscible with said water-miscible orgnaic solvent) sufficient to extract at least about 90 weight percent of the water-miscible solvent from said first stage membrane for an amount of time sufficient to form a third stage membrane containing, absorbed therein, a solvent system which consists essentially of said nonpolar organic solvent;

(c) thereafter separating said third stage membrane from the excess nonpolar hydrocarbon solvent; and (d) evaporating said solvent system from said third stage membrane to thereby form said dry, stabilized, rewettable membrane having the ability after being rewetted with water to perform as an effective reverse osmosis membrane.

14. A process as in claim 13, wherein said cellulosic membrane is a cellulose acetate membrane.

15. A process as in claim 13, wherein said water-miscible organic solvent is an alcohol containing from 1 to 4 carbon atoms, and said nonpolar organic solvent is a hydrocarbon.

16. A process as in claim 14 wherein said water-miscible organic solvent is an alcohol containing from 1 to 4 carbon atoms, and said non-polar organic solvent is a hydrocarbon.

17. A process as in claim 16, wherein said alcohol is selected from the group consisting of methanol, ethanol, n-propanol and isopropanol, and said hydrocarbon is selected from the group consisting of hexane, cyclohexane, naphtha, toluene, benzene and xylene.

18. A process as in claim 17, wherein said alcohol is isopropanol.

19. A process as in claim 17 wherein said hydrocarbon is hexane.

20. A process as in claim 18, wherein said hydrocarbon is cyclohexane.

21. A process as in claim 18, wherein said hydrocarbon is hexane.

22. A process as in claim 19, wherein said hydrocarbon is cyclohexane.

23. A process as in claim 19, wherein said hydrocarbon is hexane.

24. A process as in claim 13, wherein in step (a) said first stage membrane is produced by contacting said water-wet membrane with a blend of said water-miscible organic solvent and from about 5 to about 25 weight percent, based on the total weight of said blend, of a water soluble polyol having a melting point below about 35°.

25. A process as in claim 24, wherein said water soluble polyol is glycerine.

26. A process as in claim 24, wherein said water soluble polyol is propylene glycol.

27. A process as in claim 24, wherein said water soluble polyol is a poly(ethylene glycol).

References Cited

UNITED STATES PATENTS

| | | | |
|---|---|---|---|
| 3,129,159 | 4/1964 | Maier et al. | 106—196X |
| 3,168,409 | 2/1965 | Wellisch | 106—189X |
| 3,304,190 | 2/1967 | Wielicki et al. | 106—189 |
| 3,376,149 | 4/1968 | Gandy et al. | 106—189 |
| 3,412,184 | 11/1968 | Sharples et al. | 264—49 |
| 3,432,584 | 3/1969 | Cannon et al. | 264—49 |

OTHER REFERENCES

Vos, Kenneth D. and F. O. Burris, Jr., "Drying Cellulose Acetate Reverse Osmosis Membranes," in I and EC Product Research and Development, vol. 8, No. 1, March 1969, pp. 84–89.

PHILIP E. ANDERSON, Primary Examiner

U.S. Cl. X.R.

106—12, 196; 210—500; 260—230; 264—41, 330, 340